June 24, 1930. J. B. HENDERSON 1,765,583

AUTOMATIC CONTROL OF THE STEERING OF DIRIGIBLE CRAFT

Filed Oct. 28, 1925

James B. Henderson
INVENTOR

Moakley and Gill
ATTORNEYS

Patented June 24, 1930

1,765,583

UNITED STATES PATENT OFFICE

JAMES BLACKLOCK HENDERSON, OF BLACKHEATH, ENGLAND

AUTOMATIC CONTROL OF THE STEERING OF DIRIGIBLE CRAFT

Application filed October 28, 1925, Serial No. 65,499, and in Great Britain November 5, 1924.

My invention relates to the automatic control of the steering of ships, airships, areoplanes or other dirigible craft which require to be maintained on a given general direction from which they are liable to be deflected by external impulses due to wind, waves, etc. Many systems to effect an automatic control of steering have already been proposed and the system now to be described has for its distinguishing feature, in relation to its predecessors, that it possesses means to measure the angular acceleration of the craft and that a component control is applied in phase with the acceleration. This has the two-fold effect of producing (a) a reduction in the amount of deviation produced by external impulses and (b) a reduction in the time required to restore the vessel to its prescribed course when a deviation occurs.

In prior systems of automatic control of steering, the movement of the helm or its rate of movement have been functions of the angular displacement of the ship and of the angular velocity of yaw, while in my co-pending application Serial No. 560,491 I have also described means to apply weather helm proportional to the time-integral of the deviation.

Every ship when deviated from her prescribed course can be brought back to it by moving the helm in a large number of different ways but for automatic control the simpler the law of motion of the helm the better, and I desire to move the helm in such a manner that the ship will return to the prescribed course in a simple damped oscillation which is preferably damped so as to be approximately dead-beat. The impulses due to waves may sometimes be assisting the return and sometimes resisting it but by measuring the acceleration of yaw I control the helm so as to allow for such assistance and to compensate the resistance.

If $\Theta$ be the displacement of the ship from her prescribed course, the damped oscillation to which I try to approximate may be written $$\ddot{\Theta} + a\dot{\Theta} + b\Theta = O$$

Let $x$ be the displacement of the helm from its central position then $M$, the helm torque on the ship, is some function of $x$ which for simplicity may be assumed to be simply proportional, or $M = kx$.

As a rule there is a steady external torque on the ship due to wind, tide or other causes which is compensated by a steady deflection of the helm $x_o$ producing a balancing torque L, or $L = kx_o$.

The effective torque in bringing the ship back towards the prescribed course is $M - L$ and $$M - L = -I\ddot{\Theta}$$

where $I$ is the virtual moment of inertia of the ship in yaw.

According to my co-pending patent application Serial No. 560,491 I produce L by displacing the helm slowly, preferably in proportion to $$\int \Theta.dt, \text{ or } x_o = c \int \Theta.dt$$

$$\therefore M = -I\ddot{\Theta} + kc \int \Theta.dt$$

But I wish the ship to move in the definite oscillation $$\ddot{\Theta} + a\dot{\Theta} + b\Theta = O,$$

whence $M = I(a\dot{\Theta} + b\Theta) + kc \int \Theta .dt$ or $x = \frac{I}{k}(a\dot{\Theta} + b\Theta) + c \int \Theta.dt$ _ _ _ _ _ _ _ _ (1)

whence the displacement, $x$, of the helm is seen to have three components, one proportional to $\dot{\Theta}$, the rate of yaw, one proportional to the deviation $\Theta$, and one proportional to the time integral of the deviation to supply the weather helm.

By differentiating Equation (1) we get $$\dot{x} = a'\ddot{\Theta} + b'\dot{\Theta} + c\Theta$$

or the rate of motion of the helm has three components one proportional to $\ddot{\Theta}$, the angular acceleration, the second proportional to $\dot{\Theta}$, the rate of yaw, and the third proportional to $\Theta$, the deviation from the prescribed course, $a'$, $b'$, and $c$ being constants for any ship so long as the $f(x)$ is linear. If this function is not linear the deviations from linearity will only modify the constants in the equation for damped oscillation, and if it were ever desired in any particular case to adhere rigorously to a particular damped oscillation, a cam mechanism inserted between the tiller and the controlling gear making the displacement of the latter proportional to the helm torque would suffice.

In my present invention I measure $\theta$, $\dot\theta$ and $\ddot\theta$ on board the ship and I move the helm in one direction or the other according to whether $$-a'\ddot\theta \gtreqless b'\dot\theta + c\theta$$

and I preferably make the rate of motion of the tiller proportional to the difference so that $$\dot x = a'\ddot\theta + b'\dot\theta + c\theta.$$

In such a method of controlling the helm it will be observed that the helm has no fixed zero position relatively to the ship. In every case the helm is actuated not only by primary causes but by actual results so that if the ship be brought on to a prescribed course manually and then left to herself with the helm laid amidships, the automatic control gear would proceed by a process of trial and error to work out its own correct zero position, or weather helm position, which it would maintain when $\theta$ and $\dot\theta$ are both zero.

In the accompanying drawings, which illustrate, by way of example, a preferred embodiment of the invention:

Figure 1:
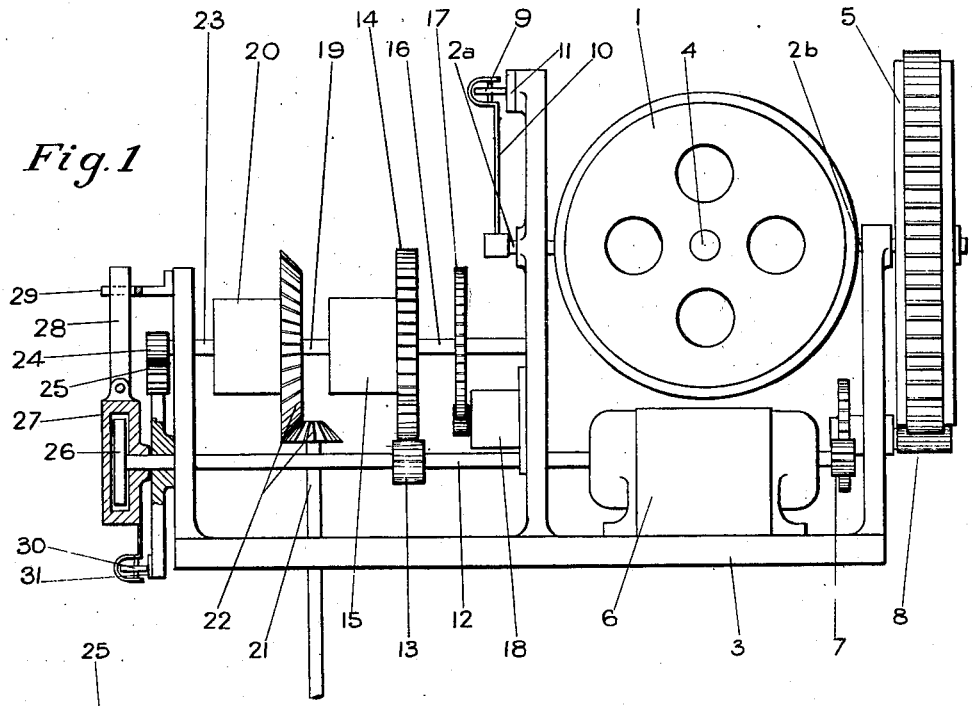
Figure 1, is a front view of the automatic control device with parts shown in section.
Figure 2:
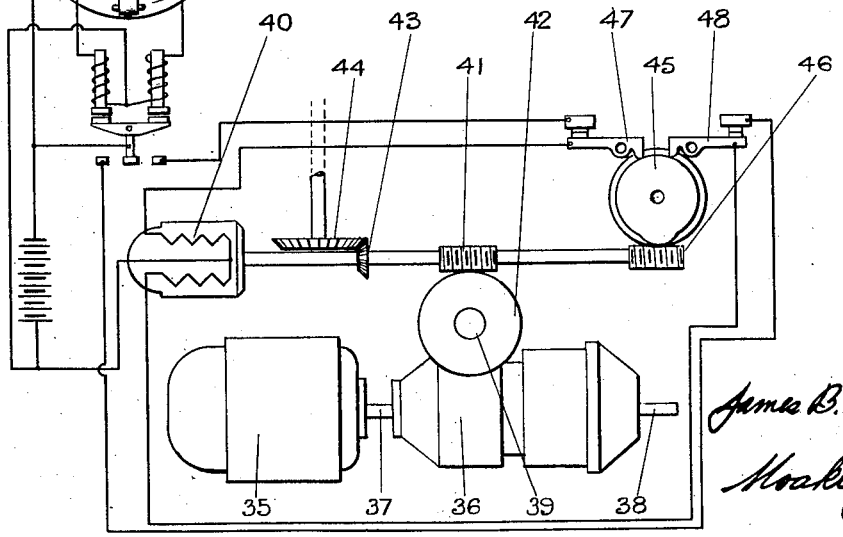
Fig. 2, is a diagrammatic view complementing Figure 1 and showing in part the electrical corrections between the various elements of the device.

The gyroscope in its casing 1 is mounted on horizontal trunnions $2^a$, $2^b$ in the frame 3 which is fixed to the deck of the ship so that the rotor axis 4 is normally parallel to the deck and preferably fore-and-aft. The gyroscope is constrained in the manner described in my co-pending application Serial No. 684,234 by one or more pairs of opposed springs like clock springs contained within the spring box 5, the inner ends of the springs being attached to the gyroscope trunnion $2^b$ and their outer ends to the box, the box itself being loosely pivoted on the trunnion $2^b$ and being capable of being turned about it by the reversible D. C. motor 6 through the gearing 7, 8. The motor 6 is controlled by the roller contact 9 attached to the trunnion $2^a$ by the crank 10 and bearing on a two-part commutator 11 which may be either directly attached to the frame 3 as shown in the drawing for simplicity, or attached to the frame 3 by springs and movable relatively thereto by a viscous brake actuated by the motor 6, as shown in my prior application Serial No. 684,234 in order to eliminate hunting of the motor. In which ever way the contacts 11 are mounted the result is the same, namely any angular movement of the ship about a vertical axis will cause the gyro to make contact between the roller 9 and one or other segment of the commutator 11 and the resulting revolution of the motor 6 will be simply proportional to $\dot\theta$, the angular velocity of the ship's movement.

The extended shaft 12 of the motor 6 carries a pinion 13, gearing with a wheel 14 on the box 15 of a differential gear, the shaft 16 of which is driven through gearing 17 by a small step-by-step motor 18 controlled from the gyro compass on the ship. The other shaft 19 of the differential gear 15 enters another differential gear 20, the box of which is rotated by the shaft 21 through the bevel gears 22, whose position in the drawing is merely diagrammatic. The shaft 21 is rotated by an amount proportional to the velocity of motion of the tiller, i. e. proportional to $\dot x$ in a manner yet to be described, and the shaft 23 emerging from the differential gear 20 carries a pinion 24 which gears with a toothed quadrant 25, loosely pivoted on the shaft 12. Since the angular displacement of the shaft 12 is proportional to $\dot\theta$ and that of the motor 18 proportional to $\theta$, it is evident that the angular motion of the shaft 19 is proportional to the sum of the two through differential 15 and that motion of the quadrant 25 through differential 20 gives the difference between this sum and the motion $(\dot x)$ of the shaft 21, i. e. $\dot x - b'\dot\theta - c\theta$.

The shaft 12 carries on its end a viscous brake the rotor of which is a disc 26 keyed to the shaft, the brake box 27 being pivoted on the shaft and constrained by the cantilever spring 28 which at its lower end is rigidly attached to the box and engages at its other end with the fork 29 fixed to the frame 3.

The brake box 27 is filled with viscous fluid and its displacement against the spring 29 when the motor 6 turns the brake disc 26 is proportional to the speed of the shaft 12, i. e. proportional to $\ddot\theta$. The box 27 carries a roller contact 30 which is kept pressed against a two-part commutator 31 fixed to the quadrant 25.

The steering gear is controlled by the motor 35 which runs continuously and drives the high speed shaft 37 of a variable speed reduction gear 36 of the variable stroke pump and motor type, the slow speed shaft 38 of which turns the telemotor wheel or otherwise actuates the tiller. This latter part of the gear is not illustrated. The arbor 39 of the variable speed gear which varies the gear ratio is actuated by a small reversible D. C. motor 40 through worm gearing 41, 42. This motor shaft also drives the shaft 21 through bevel gears 43—44, and thirdly it drives a cam 45 through gears 46 which actuates one or other of two limit switches 47, 48, which break the connections to the motor 40 when the arbor 39 has reached its maximum safe displacement. The motor 40 is controlled from the roller contact 30 through a relay and a diagrammatic representation of the wiring is superposed on the drawing, a side view of the quadrant 25 being added to facilitate reading of the diagram.

The motor 40 revolves so that the commutator 31 follows the motion of the roller 30, which varies with $\ddot{\theta}$. The motor in doing so displaces the arbor 39 and produces a speed of the shaft 38 and of the helm which it controls proportional to this displacement. Since the displacement of the shaft 21 is proportional to $\dot{x}'$, the rate of motion of the helm, and since displacement of the roller 30 is $a'\ddot{\theta}$ and that of the commutator 31 is $$\dot{x} - b'\dot{\theta} - c\theta,$$

we get $$\dot{x} = a'\ddot{\theta} + b'\dot{\theta} + c\theta.$$

In my co-pending application Serial No. 560,491 I have referred to the three component displacements of the helm as velocity or check helm, displacement helm and weather helm. In this invention check helm is controlled by the viscous brake, displacement helm by the constrained gyroscope and weather helm by the gyro compass.

In certain small craft not fitted with gyro compasses a system of automatic steering control on a velocity basis alone has already been employed, the control being actuated by a constrained gyroscope. This system is not completely satisfactory and can be considerably improved by the adoption of one or other elements of the mechanism herein described. For instance the constrained gyroscope can still be used but the addition of the viscous brake and the interposition of a variable speed gear between the control gear and the helm would permit of an automatic control of the rate of helm displacement in proportion to the angular velocity and angular acceleration, producing an actual helm displacement proportional to $a\theta + b\dot{\theta}$, i. e. a combination of displacement helm and check helm which would effect a considerable improvement by eliminating the oscillation now experienced in such craft. When weather helm is required without adding the bulk of a gyro compass, a free gyro with an electrical follow-up mechanism would supply a displacement control or alternatively the movement of the constrained gyro could be integrated by a mechanical integrator to produce a displacement control in place of the repeater motor 18 shown in the drawing. Where space, weight and expense are greater considerations than accuracy the variable speed gear shown could be replaced by a small ball and roller or friction disc variable speed gear driven by a small D. C. motor without in any way departing from the principle of the present invention.

I claim:—

1. In automatic steering control mechanism for dirigible craft, the combination of a constrained gyroscope responsive to movements of the craft about a vertical axis; motive mechanism controlled by said gyroscope, and means for measuring the angular acceleration of said craft partly controlled by said mechanism and provided with a constraining connection responsive thereto.

2. In an automatic steering control mechanism for dirigible craft, the combination of a gyroscope, motive mechanism controlled by said gyroscope and means for measuring the angular velocity of the craft partly controlled by said gyroscope and including a constraining connection to the gyroscope from an operative portion of said means and a connection to the steering means of the craft.

3. In automatic steering control for dirigible craft, the combination of a constrained gyroscope responsive to deviations of the craft from a predetermined course, motive means partly controlled by the gyroscope for measuring the angular acceleration, and helm control mechanism including an operating motor and a substantially constant speed control therefor, said mechanism being actuated in phase with the acceleration.

4. In automatic steering control, mechanism for dirigible craft, the combination of a constrained gyroscope responsive to movements of the craft about a vertical axis, means responsive to the heading of the craft, mechanism differentially controlled by said gyroscope and said means and electrically operated means responsive thereto for controlling the rate of check helm.

5. In automatic steering control mechanism for dirigible craft, the combination of mechanism responsive to immediate deviations in the course of the craft, a compass, differential mechanism jointly responsive to said mechanism and said compass, and helm mechanism jointly responsive to said differential mechanism and the rate of application of the helm.

6. In automatic steering control mechanism for dirigible craft, the combination of a constrained gyroscope responsive to movements of the craft about a vertical axis, a compass, mechanism responsive to the rate of application of the helm, and helm mechanism differentially responsive to said gyroscope, compass and mechanism for varying the rate of application of the helm.

7. In automatic steering control for dirigible craft, the combination of a constrained gyroscope responsive to movements of the craft about a vertical axis, a gyro compass, differential mechanism jointly controlled by said gyroscope and said compass, differential mechanism jointly controlled by said first differential mechanism and the movement of the helm and variable speed mechanism controlled by said last-named differential mechanism for actuating the helm.

8. An automatic steering control mechanism comprising gyroscopic mechanism responsive to movements of the craft about a vertical axis, compass mechanism, and mechanism responsive to the velocity of helm, said mechanism being conjointly operative to displace the helm according as $$-a\ddot{\theta} \gtreqless b\dot{\theta} + c\theta.$$

9. An automatic steering control mechanism comprising gyroscopic mechanism responsive to movements of the craft about a vertical axis, compass mechanism, and mechanism responsive to the velocity of helm, said mechanism being conjointly operative to displace the helm at a rate proportional to $$a\ddot{\theta} + b\dot{\theta} + c\theta.$$

10. In automatic steering control mechanism for a dirigible craft, means responsive to the angular velocity of the craft, means responsive to first said means and having movement proportional to the angular acceleration of the craft, means responsive to the heading of the craft, means moving at the same rate as the helm of the craft and differential means connecting said four means and controlling the rate of movement of the helm, whereby the rate of movement of the helm is proportional to the algebraic sum of the movements of first three said means.

JAMES BLACKLOCK HENDERSON.